United States Patent
Otake et al.

(10) Patent No.: US 11,124,680 B2
(45) Date of Patent: Sep. 21, 2021

(54) ULTRAVIOLET-CURABLE PRESSURE-SENSITIVE SILICONE ADHESIVE COMPOSITION AND CURED OBJECT OBTAINED THEREFROM

(71) Applicant: SHIN-ETSU CHEMICAL CO., LTD., Tokyo (JP)

(72) Inventors: Kohei Otake, Annaka (JP); Nobuaki Matsumoto, Annaka (JP); Tsuyoshi Matsuda, Annaka (JP); Atsushi Yaginuma, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/619,850

(22) PCT Filed: May 7, 2018

(86) PCT No.: PCT/JP2018/017581
§ 371 (c)(1),
(2) Date: Dec. 5, 2019

(87) PCT Pub. No.: WO2018/225430
PCT Pub. Date: Dec. 13, 2018

(65) Prior Publication Data
US 2020/0131408 A1 Apr. 30, 2020

(30) Foreign Application Priority Data
Jun. 6, 2017 (JP) .............................. JP2017-111805

(51) Int. Cl.
| | | |
|---|---|---|
| C08F 2/46 | (2006.01) | |
| C08F 2/50 | (2006.01) | |
| C08G 61/04 | (2006.01) | |
| C09J 7/38 | (2018.01) | |
| C09J 7/10 | (2018.01) | |

(52) U.S. Cl.
CPC ................. C09J 7/385 (2018.01); C09J 7/10 (2018.01); C09J 2433/00 (2013.01); C09J 2483/00 (2013.01)

(58) Field of Classification Search
CPC .... C08L 83/04; C09J 11/06; C09J 7/10; C09J 7/385; C09J 4/06; C09J 183/04; C09J 2483/00; C09J 2433/00; C08F 290/06; C08F 2/50; C08K 5/101
USPC ..................... 522/99, 1, 148; 520/1
See application file for complete search history.

(56) References Cited

U.S. PATENT DOCUMENTS

| 5,147,957 A | 9/1992 | Kumar | |
|---|---|---|---|
| 2003/0064232 A1 | 4/2003 | Allen et al. | |
| 2012/0045635 A1 | 2/2012 | Aoki | |
| 2020/0270481 A1* | 8/2020 | Otake | .......... C09J 4/00 |

FOREIGN PATENT DOCUMENTS

| CN | 104610696 A | | 5/2015 |
|---|---|---|---|
| CN | 106497505 | * | 3/2017 |
| CN | 106497505 A | | 3/2017 |
| JP | 3-139512 A | | 6/1991 |
| JP | 2631098 B2 | | 7/1997 |
| JP | 5234064 B2 | | 7/2013 |
| JP | 5825738 B2 | | 12/2015 |
| JP | 5989417 B2 | | 9/2016 |
| JP | 2016-190979 | * | 11/2016 |

(Continued)

OTHER PUBLICATIONS

Iwata et al, JP 2016-190979 Machine Translation, Nov. 10, 2016 (Year: 2016).*

(Continued)

Primary Examiner — Jessica Whiteley

(74) Attorney, Agent, or Firm — Birch, Stewart, Kolasch & Birch, LLP.

(57) ABSTRACT

An ultraviolet-curable pressure-sensitive silicone adhesive composition which comprises: 100 parts of an organopolysiloxane (A) having, in the molecule, two groups represented by general formula (1)

$$-\underset{\underset{R^1}{|}}{\overset{\overset{R^1}{|}}{Si}}-R^2-\left(\underset{\underset{R^1}{|}}{\overset{\overset{R^1}{|}}{Si}}-O\right)_p-Si(R^3)_a(R^1)_{3-a} \quad (1)$$

(wherein $R^1$ represents a $C_{1-20}$ monovalent hydrocarbon group, $R^2$ represents an oxygen atom, etc., $R^3$ represents an acryloyloxyalkyl group, etc., p and a respectively indicate numbers satisfying $0 \leq p \leq 10$ and $1 \leq a \leq 3$); 1-500 parts of a monofunctional (meth)acrylate compound (B) containing no siloxane structure and/or a polyfunctional (meth)acrylate compound (C) containing no siloxane structure; 1-5,000 parts of an oranopolysiloxane resin (D) comprising $R^4_3SiO_{1/2}$ units (a) (wherein $R^4$ represents a $C_{1-10}$ monovalent hydrocarbon group) and $SiO_{4/2}$ units (b), the (a)/(b) molar ratio being (0.6-1.2)/1; and 0.01-20 parts of a photopolymerization initiator (E). This composition has satisfactory applicability and curability and gives a cured object which, when used as a temporary fixer, has excellent tackiness and strength.

5 Claims, No Drawings

(56) References Cited

FOREIGN PATENT DOCUMENTS

| | | |
|---|---|---|
| JP | 2016-190979 A | 11/2016 |
| KR | 10-2016-0129219 A | 11/2016 |
| WO | WO 01/05846 A1 | 1/2001 |
| WO | WO 2017/048890 A1 | 3/2017 |
| WO | WO 2017/068762 A1 | 4/2017 |

OTHER PUBLICATIONS

Zhou et al, CN 106497505 Machine Translation, 3-215-2017 (Year: 2017).*
International Search Report (PCT/ISA/210) issued in PCT/JP2018/017581, dated Jul. 3, 2018.
Written Opinion of the International Searching Authority (PCT/ISA/237) issued in PCT/JP2018/017581, dated Jul. 3, 2018.

* cited by examiner

ULTRAVIOLET-CURABLE PRESSURE-SENSITIVE SILICONE ADHESIVE COMPOSITION AND CURED OBJECT OBTAINED THEREFROM

TECHNICAL FIELD

This invention relates to an ultraviolet (UV) cure type silicone pressure-sensitive adhesive (PSA) composition and a cured product thereof. More particularly, it relates to a UV cure type silicone PSA composition and a cured product thereof which is useful as a temporary adhesive for transferring objects.

BACKGROUND ART

Recent electronic instruments, typically smartphones, liquid crystal displays and automobile parts face demands not only for higher performance, but also for more space and energy savings. To meet such societal demands, electrical and electronic parts mounted thereon are made smaller and finer. Their assembly process thus becomes more complicated and difficult year by year.

The technology capable of transferring such microstructures and parts selectively and at a time was recently developed (see Non-Patent Document 1), attracting engineers' attention.

This technology known as "micro transfer printing technology" uses the bonding force of an elastomer to pick up microstructures at a time and transfer them to a desired place having a stronger bonding force.

Silicone elastomers are known as the pressure-sensitive adhesive material for use in this application. Many heat-cure type solventless silicone-base pressure-sensitive adhesives were proposed (see Patent Documents 1 to 3).

On use of heat-cure type silicone-base PSAs, however, the heating step is essential, requiring certain energy. Also, a long time is taken in heating and cooling the material.

To omit such steps, a silicone resin which is curable with UV in a short time was developed (Patent Document 4). Since this approach utilizes the bonding force of the silicone material itself and has insufficient adhesion, the applicable range of devices and parts is limited.

Therefore, there is a need for a UV-curable silicone PSA having a stronger bonding force which is applicable to even the devices and parts that cannot be lifted up by the material of Patent Document 4.

However, simply increasing the bonding force gives rise to the problems that cohesive failure is likely to occur during peeling of the PSA from the object (i.e., device or part) to be transferred, and in addition, the PSA remains on the transferred object. It is thus desired to develop a material which is UV-curable and has a bonding force adjustable from weak to strong depending on members, and does not undergo cohesive failure during peeling despite the strong bonding force.

PRIOR ART DOCUMENTS

Patent Documents

Patent Document 1: JP 5825738
Patent Document 2: JP 2631098
Patent Document 3: JP 5234064
Patent Document 4: JP 5989417

Non-Patent Documents

Non-Patent Document 1: JOHN A. ROGERS, "Transfer printing by kinetic control of adhesion to an elastometric stamp", nature materials, Nature Publishing Group, 11 Dec. 2005, Vol. 6, pp. 33-38

SUMMARY OF INVENTION

Technical Problem

An object of the invention, which has been made under the above-mentioned circumstances, is to provide a UV cure type silicone PSA composition which is good in working and cure and gives a cured product having appropriate adhesiveness and strength as temporary adhesive and a cured product thereof.

Solution to Problem

Making extensive investigations to attain the above object, the inventors have found that by using a specific organopolysiloxane having a (meth)acryloyloxy-containing group, a monofunctional (meth)acrylate compound free of siloxane structure and/or a polyfunctional (meth)acrylate compound free of siloxane structure, and a particular organopolysiloxane resin, there is obtained a UV cure type silicone composition which is rapidly cured on UV irradiation into a cured product having satisfactory adhesiveness and strength. The invention is predicated on this finding.

Accordingly, the invention provides the following.

1. A UV cure type silicone pressure-sensitive adhesive composition comprising:
(A) 100 parts by weight of an organopolysiloxane having, in the molecule, two groups of the general formula (1):

[Chem. 1]

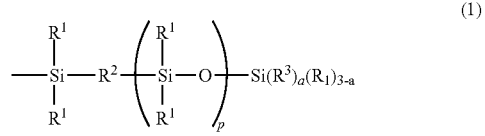

wherein $R^1$ is each independently a $C_1$-$C_{20}$ monovalent hydrocarbon group, $R^2$ is oxygen or $C_1$-$C_{20}$ alkylene group, $R^3$ is an acryloyloxyalkyl, methacryloyloxyalkyl, acryloyloxyalkyloxy or methacryloyloxyalkyloxy group, p is a number in the range: $0 \leq p \leq 10$, and a is a number in the range: $1 \leq a \leq 3$, (B) a monofunctional (meth)acrylate compound free of siloxane structure and/or
(C) a polyfunctional (meth)acrylate compound free of siloxane structure, in an amount of 1 to 500 parts by weight,
(D) 1 to 5,000 parts by weight of an organopolysiloxane resin composed of (a) $R^4_3SiO_{1/2}$ units wherein $R^4$ is a $C_1$-$C_{10}$ monovalent hydrocarbon group and (b) $SiO_{4/2}$ units, a molar ratio of (a) units to (b) units being in the range of from 0.6/1 to 1.2/1, and
(E) 0.01 to 20 parts by weight of a photopolymerization initiator.
2. The UV cure type silicone pressure-sensitive adhesive composition of 1, further comprising (F) an organopolysiloxane having one acryloyloxyalkyl or methacryloyloxyalkyl group in the molecule in an amount of 0.1 to 1,000 parts by weight per 100 parts by weight of component (A).
3. The UV cure type silicone pressure-sensitive adhesive composition of 1 or 2 which has a viscosity of up to 100,000 mPa·s at 23° C.

4. A cured product of the UV cure type silicone pressure-sensitive adhesive composition of any one of 1 to 3.

5. A pressure-sensitive adhesive comprising the cured product of 4.

Advantageous Effects of Invention

The UV cure type silicone PSA composition is good in working and cure and its cured product has appropriate adhesiveness and strength as a temporary adhesive.

DESCRIPTION OF EMBODIMENTS

Now the invention is described in detail.

The invention provides a UV cure type silicone pressure-sensitive adhesive (PSA) composition comprising:

(A) 100 parts by weight of an organopolysiloxane having two groups of the following general formula (1) in the molecule, (B) a monofunctional (meth)acrylate compound free of siloxane structure and/or (C) a polyfunctional (meth)acrylate compound free of siloxane structure, in an amount of 1 to 500 parts by weight, (D) 1 to 5,000 parts by weight of an organopolysiloxane resin composed of (a) $R^4_3SiO_{1/2}$ units wherein $R^4$ is a substituted or unsubstituted $C_1$-$C_{10}$ monovalent hydrocarbon group and (b) $SiO_{4/2}$ units, a molar ratio of (a) units to (b) units being in the range of from 0.6/1 to 1.2/1, and (E) 0.01 to 20 parts by weight of a photopolymerization initiator.

(A) Organopolysilixane

Component (A) used herein, which serves as a crosslinking component of the composition, is an organopolysiloxane having two groups of the following general formula (1) in the molecule and a backbone consisting essentially of repeating diorganosiloxane units.

[Chem. 2]

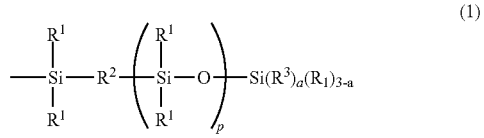

(1)

In formula (1), $R^1$ is each independently a $C_1$-$C_{20}$ monovalent hydrocarbon group, preferably $C_1$-$C_{10}$, and more preferably $C_1$-$C_8$ monovalent hydrocarbon group free of aliphatic unsaturation. $R^2$ is oxygen or a $C_1$-$C_{20}$, preferably $C_1$-$C_{10}$, more preferably $C_1$-$C_5$ alkylene group. $R^3$ is an acryloyloxyalkyl, methacryloyloxyalkyl, acryloyloxyalkyloxy or methacryloyloxyalkyloxy group, p is a number in the range: $0 \le p \le 10$, and a is a number in the range: $1 \le a \le 3$.

In formula (1), the $C_1$-$C_{20}$ monovalent hydrocarbon group $R^1$ may be straight, branched or cyclic. Examples thereof include alkyl groups such as methyl, ethyl, n-propyl, isopropyl, n-butyl, isobutyl, tert-butyl, n-hexyl, cyclohexyl, n-octyl, 2-ethylhexyl, and n-decyl; alkenyl groups such as vinyl, allyl (or 2-propenyl), 1-propenyl, isopropenyl, and butenyl; aryl groups such as phenyl, tolyl, xylyl, and naphthyl; and aralkyl groups such as benzyl, phenylethyl, and phenylpropyl.

Also, in these monovalent hydrocarbon groups, some or all of the carbon-bonded hydrogen atoms may be substituted by other substituents. Examples include halo- or cyano-substituted hydrocarbon groups such as chloromethyl, bromoethyl, trifluoropropyl, and cyanoethyl.

Of these, $R^1$ is preferably selected from $C_1$-$C_5$ alkyl groups and phenyl, with methyl, ethyl and phenyl being more preferred.

The $C_1$-$C_{20}$ alkylene group $R^2$ may be straight, branched or cyclic. Examples thereof include methylene, ethylene, propylene, trimethylene, tetramethylene, isobutylene, pentamethylene, hexamethylene, heptamethylene, octamethylene, nonamethylene, and decylene.

Inter alia, $R^2$ is preferably selected from oxygen, methylene, ethylene, and propylene, with oxygen and ethylene being more preferred.

Although the carbon count of the alkyl (or alkylene) group in acryloyloxyalkyl, methacryloyloxyalkyl, acryloyloxyalkyloxy and methacryloyloxyalkyloxy groups represented by $R^3$ is not particularly limited, it is preferably 1 to 10, more preferably 1 to 5. Examples of the alkyl group are those alkyl groups of 1 to 10 carbon atoms among the groups exemplified above for $R^1$.

Examples of group $R^3$ include those of the following formulae, but are not limited thereto.

[Chem. 3]

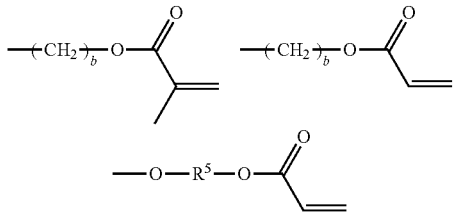

Herein b is a number in the range: $1 \le b \le 4$ and $R^5$ is a $C_1$-$C_{10}$ alkylene group.

In formula (1), p is a number in the range: $0 \le p \le 10$, preferably 0 or 1, and a is a number in the range: $1 \le a \le 3$, preferably 1 or 2.

In the molecule of the organopolysiloxane as component (A), the group of formula (1) may be attached to the end of the molecular chain and/or non-terminal positions of the molecular chain (i.e., positions midway the molecular chain or side chains from the molecular chain). For flexibility, the group of formula (1) is preferably present at only the end of the molecular chain.

In the molecule of the organopolysiloxane as component (A), silicon-bonded organic groups other than the group of formula (1) are as exemplified above for $R^1$, preferably $C_1$-$C_{12}$, more preferably $C_1$-$C_{10}$ monovalent hydrocarbon groups free of aliphatic unsaturation.

Examples thereof are as exemplified above for $R^1$. Among others, alkyl, aryl and haloalkyl groups are preferred for ease of synthesis, with methyl, phenyl and trifluoropropyl being more preferred.

Component (A) has a molecular structure which is basically a linear or branched backbone (inclusive of partially branched, linear backbone) composed of repeating diorganosiloxane units, and is preferably a linear diorganopolysiloxane capped at both ends of the molecular chain with the group of formula (1).

Component (A) may be a homopolymer having such molecular structure, a copolymer having such molecular structure, or a mixture of two or more polymers.

The organopolysiloxane (A) preferably has a viscosity at 25° C. of 10 to 100,000 mPa·s, more preferably 10 to 50,000 mPa·s for enhancing workability of the composition and dynamic properties of the cured product. In the case of the linear organopolysiloxane, this viscosity range typically corresponds to a number average degree of polymerization of about 10 to about 2,000, more preferably about 50 to about 1,100. As used herein, the viscosity may be measured by a rotational viscometer, for example, BL, BH, BS or cone-plate type viscometer or rheometer (the same holds true, hereinafter).

As used herein, the degree of polymerization (or molecular weight) may be determined, for example, as a number average degree of polymerization (or number average molecular weight) by gel permeation chromatography (GPC) versus polystyrene standards using toluene as developing solvent (the same holds true, hereinafter).

Examples of the organopolysiloxane (A) include those of the following formulae (2) to (4), but are not limited thereto.

[Chem. 4]

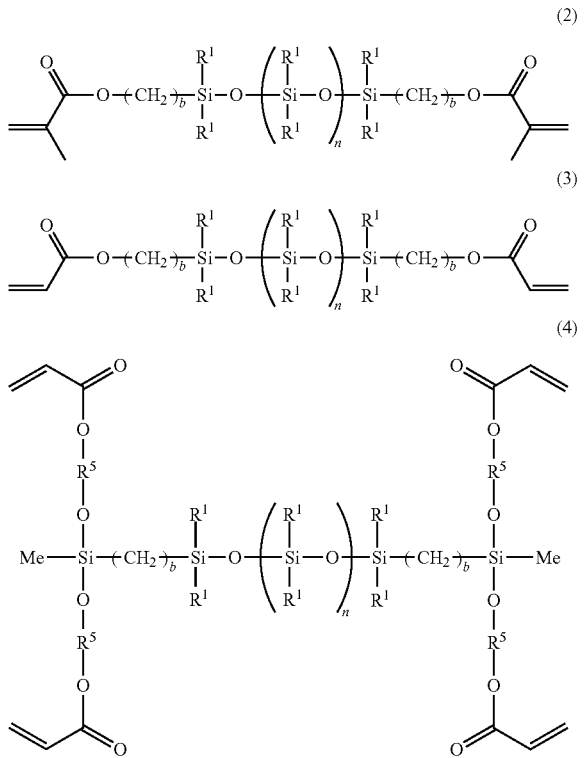

Herein $R^1$, $R^5$ and b are as defined above, and n is such a number that the organopolysiloxane may have a viscosity within the above range, preferably a number of 1 to 800, more preferably 50 to 600.

The organopolysiloxane may be synthesized by well-known methods. For example, the organopolysiloxane of formula (2) is obtained as the product of hydrosilylation reaction between a both end dimethylvinylsiloxy-capped dimethylsiloxane/diphenylsiloxane copolymer and 3-(1,1,3,3-tetramethyldisiloxanyl)propyl methacrylate (CAS No. 96474-12-3).

The organopolysiloxane of formula (3) may be obtained from reaction of the product of hydrosilylation reaction between a both end dimethylvinylsiloxy-capped dimethylsiloxane/diphenylsiloxane copolymer and chlorodimethylsilane, with 2-hydroxyethyl acrylate.

The organopolysiloxane of formula (4) may be obtained from reaction of the product of hydrosilylation reaction between a both end dimethylvinylsiloxy-capped dimethylsiloxane/diphenylsiloxane copolymer and dichloromethylsilane, with 2-hydroxyethyl acrylate.

(B) Monofunctional (Meth)Acrylate Compound Free of Siloxane Structure

Examples of the monofunctional (meth)acrylate compound free of siloxane structure (B) include isoamyl acrylate, lauryl acrylate, stearyl acrylate, ethoxy-diethylene glycol acrylate, methoxy-triethylene glycol acrylate, 2-ethylhexyl-diglycol acrylate, phenoxyethyl acrylate, phenoxy diethylene glycol acrylate, tetrahydrofurfuryl acrylate, and isobornyl acrylate. They may be used alone or in admixture.

Of these, isobornyl acrylate is preferred.

(C) Polyfunctional (Meth)Acrylate Compound Free of Siloxane Structure

Examples of the polyfunctional (meth)acrylate compound free of siloxane structure (C) include triethylene glycol diacrylate, polytetramethylene glycol diacrylate, neopentyl glycol diacrylate, 1,6-hexanediol diacrylate, dimethylol-tricyclodecane diacrylate, trimethylol-propane triacrylate, and pentaerythritol tetraacrylate. They may be used alone or in admixture.

Of these, dimethylol-tricyclodecane diacrylate is preferred.

The total amount of the (meth)acrylate compounds as components (B) and (C) added is in the range of 1 to 500 parts by weight per 100 parts by weight of component (A). If the amount of components (B) and (C) added is less than 1 part by weight per 100 parts by weight of component (A), the composition has insufficient curability and the cured product is poor in strength and adhesiveness. On the other hand, the viscosity of the overall composition can be adjusted by increasing the amount of components (B) and (C). However, if the amount of components (B) and (C) added exceeds 500 parts by weight per 100 parts by weight of component (A), the cured product has too high a hardness to provide the desired adhesiveness.

The amount of components (B) and (C) added is preferably 10 to 200 parts by weight per 100 parts by weight of component (A).

(D) Organopolysiloxane Resin

Component (D) for imparting adhesiveness to the cured product is an organopolysiloxane resin composed of (a) $R^4_3SiO_{1/2}$ units wherein $R^4$ is a $C_1$-$C_{10}$ monovalent hydrocarbon group and (b) $SiO_{4/2}$ units, with a molar ratio of (a) units to (b) units being in the range of 0.6/1 to 1.2/1.

Examples of the $C_1$-$C_{10}$ monovalent hydrocarbon group $R^4$ include those monovalent hydrocarbon groups of 1 to 10 carbon atoms among the groups exemplified above for $R^1$. Of these, preference is given to $C_2$-$C_6$ alkyl groups such as methyl, ethyl, n-propyl, and n-butyl; $C_6$-$C_{10}$ aryl groups such as phenyl and tolyl; $C_7$-$C_{10}$ aralkyl groups such as benzyl; and $C_2$-$C_6$ alkenyl groups such as vinyl, allyl, and butenyl.

Like $R^1$, some or all of the carbon-bonded hydrogen atoms on the monovalent hydrocarbon group $R^4$ may be substituted by substituents as described above.

In component (D), the molar ratio of (a) $R^4_3SiO_{1/2}$ units (M units) and (b) $SiO_{4/2}$ units (Q units), that is, M units to Q units is in the range of 0.6/1 to 1.2/1. If the molar ratio of M units is less than 0.6, the cured product may experience a drop of bonding force or tack. If the molar ratio exceeds 1.2, the cured product may experience a drop of bonding or retaining force.

For adjusting the bonding force, retaining force, and tack of a cured product to an appropriate range, the molar ratio of M units to Q units is preferably in the range of 0.7/1 to 1.2/1.

(E) Photopolymerization Initiator

Examples of the photopolymerization initiator which can be used herein include 2,2-diethoxyacetophenone, 2,2-dimethoxy-1,2-diphenylethan-1-one (Irgacure 651, BASF), 1-hydroxycyclohexyl phenyl ketone (Irgacure 184, BASF), 2-hydroxy-2-methyl-1-phenyl-propan-1-one (Irgacure 1173, BASF), 2-hydroxy-1-{4-[4-(2-hydroxy-2-methyl-propionyl)-benzyl]-phenyl}-2-methyl-propan-1-one (Irgacure 127, BASF), phenylglyoxylic acid methyl ester (Irgacure MBF, BASF), 2-methyl-1-[4-(methylthio)phenyl]-2-morpholino-propan-1-one (Irgacure 907, BASF), 2-benzyl-2-dimethyl-amino-1-(4-morpholinophenyl)-1-butanone (Irgacure 369, BASF), bis(2,4,6-trimethylbenzoyl)-phenylphosphine oxide (Irgacure 819, BASF), and 2,4,6-trimethylbenzoyl-diphenyl-phosphine oxide (Irgacure TPO, BASF). They may be used alone or in admixture.

Of these, 2,2-diethoxyacetophenone, 2-hydroxy-2-methyl-1-phenyl-propan-1-one (Irgacure 1173, BASF), bis(2,4,6-trimethylbenzoyl)-phenylphosphine oxide (Irgacure 819, BASF), and 2,4,6-trimethylbenzoyl-diphenyl-phosphine oxide (Irgacure TPO, BASF) are preferred from the aspect of compatibility with component (A).

The amount of the photopolymerization initiator added is in the range of 0.1 to 20 parts by weight per 100 parts by weight of component (A). An amount of less than 0.1 part by weight leads to insufficient curability whereas an amount in excess of 20 parts by weight adversely affects depth-curability.

(F) Organopolysiloxane

In addition to the foregoing essential components, the inventive UV cure type silicone PSA composition may comprise an organopolysiloxane having one acryloyloxyalkyl or methacryloyloxyalkyl group in the molecule, if necessary. Component (F) blended in the composition permits the cured product to be adjusted in flexibility and adhesiveness.

Examples of the acryloyloxyalkyl group include acryloyloxybutyl and acryloyloxypropyl and examples of the methacryloyloxyalkyl group include methacryloyloxybutyl and methacryloyloxypropyl. Methacryloyloxypropyl and acryloyloxypropyl are preferred for ease of synthesis.

In the molecule of the organopolysiloxane as component (F), silicon-bonded organic groups other than the acryloyloxyalkyl or methacryloyloxyalkyl group are as exemplified above for $R^1$, preferably $C_1$-$C_{12}$, more preferably $C_1$-$C_{10}$ monovalent hydrocarbon groups free of aliphatic unsaturation.

Examples of the monovalent hydrocarbon group are as exemplified above for $R^1$. Of these, alkyl, aryl and haloalkyl groups are preferred for ease of synthesis, with methyl, phenyl and trifluoropropyl being more preferred.

The organopolysiloxane (F) preferably has a viscosity at 25° C. of 1 to 100,000 mPa·s, more preferably 1 to 10,000 mPa·s for enhancing workability of the composition and dynamic properties of the cured product. This viscosity range typically corresponds to a number average degree of polymerization of about 5 to about 1,000, more preferably about 5 to about 500.

In the molecule of the organopolysiloxane as component (F), the acryloyloxyalkyl or methacryloyloxyalkyl group may be attached to the end of the molecular chain and/or non-terminal positions of the molecular chain (i.e., positions midway the molecular chain or side chains from the molecular chain). For ease of synthesis and cost, one acryloyloxyalkyl or methacryloyloxyalkyl group is preferably present at one end of the molecule.

Examples of component (F) include those of the following formulae (5) and (6), but are not limited thereto.

[Chem. 5]

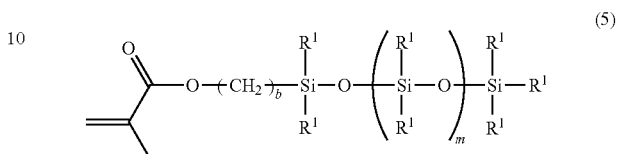

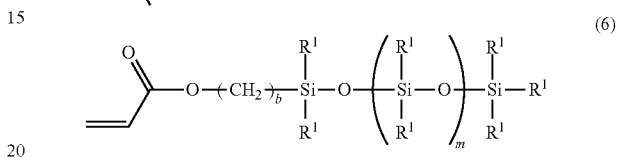

Herein b and $R^1$ are as defined above, and m is such a number that the organopolysiloxane may have a viscosity within the range, preferably a number of 1 to 200, more preferably 10 to 100.

The inventive composition may further comprise additives such as colorants (i.e., pigments and dyes), silane coupling agents, adhesive aids, polymerization inhibitors, antioxidants, and light resistance stabilizers (for example, UV absorbers and photostabilizers) as long as the benefits of the invention are not impaired.

Also, the composition may be properly mixed with other resin compositions prior to use.

The UV cure type silicone PSA composition may be obtained by combining components (A), (B), (C), (D) and (E), optionally component (F) and other components in any desired order and stirring. The machine used for stirring operation is not particularly limited. Suitable machines include a mortar grinder, three-roll mill, ball mill, and planetary mixer. These machines may also be used in a suitable combination.

Although the viscosity of the UV cure type silicone PSA composition is not particularly limited, it is preferred from the aspect of workability that the viscosity at 23° C. be up to 100,000 mPa·s, more preferably up to 50,000 mPa·s. The lower limit is typically about 100 mPa·s, though not critical.

The UV cure type silicone PSA composition is rapidly cured on UV irradiation.

Examples of the light source for UV irradiation include UV LED lamps, high-pressure mercury lamps, extra-high pressure mercury lamps, metal halide lamps, carbon arc lamps, and xenon lamps.

For example, when the inventive composition is shaped into a sheet of about 2.0 mm thick, it is preferably given a UV exposure dose (accumulative light quantity) of 1 to 10,000 mJ/cm$^2$, more preferably 10 to 6,000 mJ/cm$^2$. Specifically, when UV having an illuminance of 100 mW/cm$^2$ is used, UV may be irradiated for about 0.01 to about 100 seconds.

The cured product obtained from UV irradiation preferably has a bonding force of 0.01 to 100 MPa, more preferably 0.02 to 50 MPa in consideration of a balance between adhesion and release of the object to be transferred although the bonding force is not particularly limited.

Also, the UV cure type silicone PSA composition may be used as PSA articles by coating it to various substrates and UV curing.

The substrate is not particularly limited and plastic films, glass and metals may be used.

Suitable plastic films include polyethylene films, polypropylene films, polyester films, polyimide films, polyvinyl chloride films, polyvinylidene chloride films, polyvinyl alcohol films, polycarbonate films, polystyrene films, ethylene-vinyl acetate copolymer films, ethylene-vinyl alcohol copolymer films, and triacetyl cellulose films.

The glass used herein is not particularly limited with respect to the thickness and type, and even chemically strengthened glass is acceptable.

For improving the adhesion between the substrate and the PSA layer, the substrate may be treated such as by primer treatment or plasma treatment, prior to use.

The coating means or method may be selected as appropriate from well-known coating means or methods such as a spin coater, comma coater, lip coater, roll coater, die coater, knife coater, blade coater, rod coater, kiss coater, gravure coater, screen printing, dipping and casting methods.

Since the UV cure type silicone PSA composition is of solventless type, a cured product thereof can also be prepared by potting in a template.

In case bubbles are entrapped in the potting step of pouring the composition into a template, the bubbles can be removed under reduced pressure. The template used herein may be, for example, a resist pattern, that is, a photoresist film which is engraved with a desired contour on a silicon wafer.

If it is desired to take out the cured product from the template, preferably the template is treated with a parting agent before potting of the composition. For example, fluorine and silicone base parting agents may be used.

The UV cure type silicone PSA composition is generally used as such. Where the composition must be improved in handling and coating to substrates, it is acceptable to dilute the composition with an organic solvent prior to use as long as the desired properties are not compromised.

EXAMPLES

Examples and Comparative Examples are given below for further illustrating the invention although the invention is not limited thereto.

It is noted that the compounds used in Examples are shown below.

Component (A)

[Chem. 6]

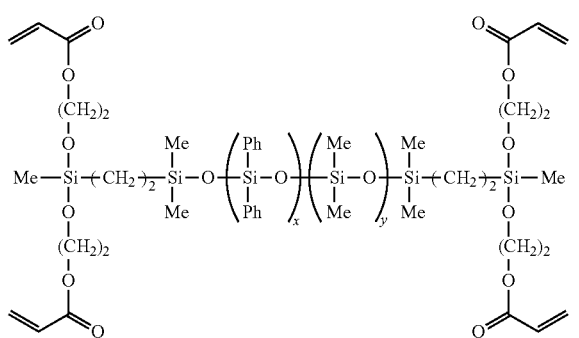

(A-1)

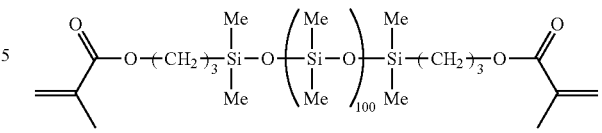

(A-2)

In formula (A-1), x=30, y=240 and the repeating units in parentheses with subscripts x and y may be arranged in any sequence.

Component (B)

(B-1)

Isobornyloxy acrylate (Light Acrylate IB-XA, Kyoeisha Chemical Co., Ltd.)

(B-2)

Acryloxymethyl-pentamethyldisiloxane

[Chem. 7]

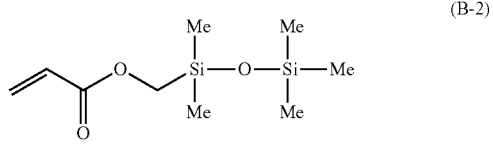

(B-2)

Component (C)

(C-2)

Dimethylol-tricyclodecane diacrylate (Light Acrylate DCP-A, Kyoeisha Chemical Co., Ltd.)

Component (D)

(D-1)

A 60 wt % toluene solution of an organopolysiloxane resin consisting of $Me_3SiO_{1/2}$ units and $SiO_2$ units in a molar ratio of ($Me_3SiO_{1/2}$ units)/($SiO_2$ units) of 0.85/1 (number average molecular weight 3,500)

Component (E)

(E-1)

2-Hydroxy-2-methyl-1-phenyl-propan-1-one (Irgacure 1173, BASF Japan, Ltd.)

Component (F)

[Chem. 8]

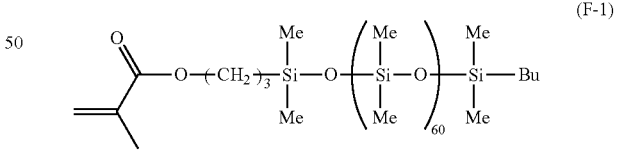

(F-1)

Examples 1 to 4 and Comparative Examples 1 to 3

Silicone compositions shown in Table 1 were prepared by blending components (A) to (F) in accordance with the formulation in Table 1 and distilling off toluene at 100° C. in vacuum. Notably, the viscosity of the composition in Table 1 was measured at 23° C. by a rotational viscometer.

The silicone composition was cured by exposure to UV of wavelength 365 nm from an Eye UV electronic control instrument (model: UBX0601-01, Eye Graphics Co., Ltd.) at room temperature (25° C.) in a nitrogen atmosphere such that the exposure dose of UV light was 4,000 mJ/cm². The hardness of the cured product was measured according to The Society of Rubber Industry, Japan Standard, SRIS0101.

The adhesiveness of the cured product was measured by a compact table top tester EZ-SX (Shimadzu Corp.). The procedure included pressing a stainless steel (SUS) probe of 1 mm square to the cured product of 1 mm thick under 1 MPa for 15 seconds and then pulling back the probe at a rate of 100 mm/min while measuring the load (bonding force) required for pulling. The test piece was visually observed and evaluated for cohesive failure on its surface. The results are all shown in Table 1.

TABLE 1

|  |  | Example |  |  |  | Comparative Example |  |  |
|---|---|---|---|---|---|---|---|---|
|  |  | 1 | 2 | 3 | 4 | 1 | 2 | 3 |
| Formulation (parts by weight) | A-1 | 100 |  |  | 100 | 100 |  | 100 |
|  | A-2 |  | 100 | 100 |  |  | 100 |  |
|  | B-1 | 25 | 30 | 30 | 60 |  | 30 |  |
|  | B-2 |  |  |  |  |  |  | 30 |
|  | C-1 |  |  | 2 |  |  |  |  |
|  | D-1 | 125 | 90 | 90 | 160 | 125 | 10,000 | 200 |
|  | E-1 | 5 | 5 | 5 | 5 | 5 | 5 | 5 |
|  | F-1 |  |  |  | 80 |  |  |  |
| Physical properties of composition | Viscosity (mPa · s) | 10,140 | 450 | 430 | 950 | 190,000 | — | 16,440 |
| Physical properties of cured product | Hardness (Asker C) | 13 | 30 | 35 | 3 | 13 | — | 3 |
|  | Bonding force (MPa) | 2.1 | 1.0 | 0.9 | 1.1 | 0.6 | — | 2.6 |
|  | Cohesive failure | nil | nil | nil | nil | nil | — | failure |

As seen from Table 1, the UV cure type silicone PSA compositions prepared in Examples 1 to 4 are good in working and cure and the cured products thereof have excellent adhesiveness and satisfactory strength as demonstrated by no evidence of cohesive failure. The cure products are thus useful as temporary adhesive for transferring very small objects such as devices.

On the other hand, the composition of Comparative Example 1 not containing components (B) and (C) has an extremely high viscosity that interferes with working.

The composition of Comparative Example 2 wherein component (D) is blended in an excessive amount outside the range of the invention solidifies and is difficult to handle.

The composition of Comparative Example 3 using a siloxane structure-containing monofunctional acrylate compound as component (B) cures into a cured product which has high adhesiveness, but insufficient strength as demonstrated by cohesive failure in the adhesive test.

The invention claimed is:

1. A UV cure type silicone pressure-sensitive adhesive composition comprising:
   (A) 100 parts by weight of an organopolysiloxane having, in the molecule, two groups of the general formula (1):

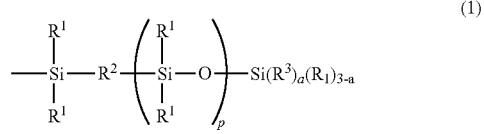

(1)

wherein $R^1$ is each independently a $C_1$-$C_{20}$ monovalent hydrocarbon group, $R^2$ is oxygen or $C_1$-$C_{20}$ alkylene group, $R^3$ is an acryloyloxyalkyl, methacryloyloxyalkyl, acryloyloxyalkyloxy or methacryloyloxyalkyloxy group, p is a number in the range: $0 \leq p \leq 10$, and a is a number in the range: $1 \leq a \leq 3$, (B) a monofunctional (meth)acrylate compound free of siloxane structure and/or (C) a polyfunctional (meth)acrylate compound free of siloxane structure, in an amount of 1 to 500 parts by weight, (D) 1 to 5,000 parts by weight of an organopolysiloxane resin composed of (a) $R^4{}_3SiO_{1/2}$ units wherein $R^4$ is a $C_1$-$C_{10}$ monovalent hydrocarbon group and (b) $SiO_{4/2}$ units, a molar ratio of (a) units to (b) units being in the range of from 0.6/1 to 1.2/1, and (E) 0.01 to 20 parts by weight of a photopolymerization initiator, wherein (B) the monofunctional (meth)acrylate compound free of siloxane structure is at least one selected from the group consisting of isoamyl acrylate, lauryl acrylate, stearyl acrylate, ethoxy-diethylene glycol acrylate, methoxy-triethylene glycol acrylate, 2-ethyl-hexyl-diglycol acrylate, phenoxyethyl acrylate, phenoxy diethylene glycol acrylate, tetrahydrofurfuryl acrylate, and isobornyl acrylate, and (C) the polyfunctional (meth)acrylate compound free of siloxane structure (C) is at least one selected from the group consisting of triethylene glycol diacrylate, polytetramethylene glycol diacrylate, neopentyl glycol diacrylate, 1,6-hexanediol diacrylate, dimethylol-tricyclodecane diacrylate, trimethylol-propane triacrylate, and pentaerythritol tetraacrylate.

2. The UV cure type silicone pressure-sensitive adhesive composition of claim 1, further comprising (F) an organopolysiloxane having one acryloyloxyalkyl or methacryloyloxyalkyl group in the molecule in an amount of 0.1 to 1,000 parts by weight per 100 parts by weight of component (A).

3. The UV cure type silicone pressure-sensitive adhesive composition of claim 1 or 2 which has a viscosity of up to 100,000 mPa·s at 23° C.

4. A cured product of the UV cure type silicone pressure-sensitive adhesive composition of claim 1 or 2.

5. A pressure-sensitive adhesive comprising the cured product of claim 4.

* * * * *